Jan. 24, 1950 R. LE R. NAFZIGER 2,495,469
ART OF BAKING
Filed June 16, 1944
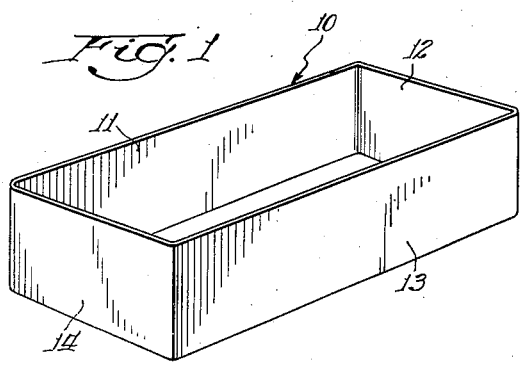
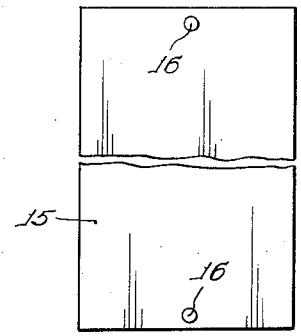
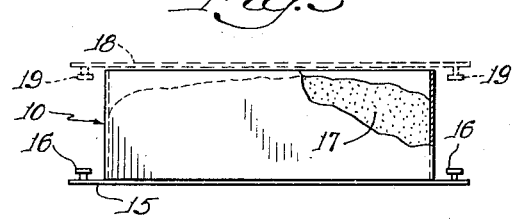
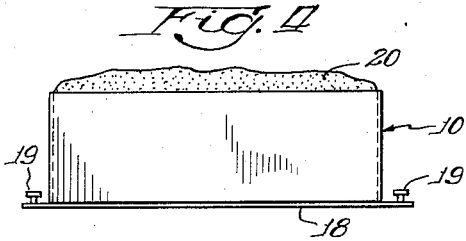
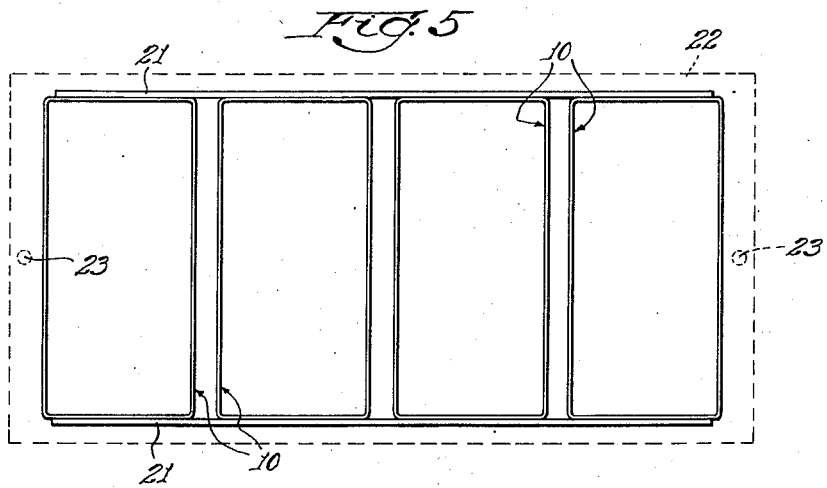
Inventor:
Ralph LeRoy Nafziger
By: A. Trevor Jones
Atty.

Patented Jan. 24, 1950

2,495,469

UNITED STATES PATENT OFFICE 2,495,469

ART OF BAKING

Ralph Le Roy Nafziger, Chicago, Ill.

Application June 16, 1944, Serial No. 540,557

1 Claim. (Cl. 107—54)

This invention relates to art of baking and particularly bread baking on a commercial scale.

It is well-known that the use of bakery-made bread is constantly increasing, particularly under the demands of war-time conditions, and that efforts are constantly being made and through continual research on the part of the bakery trade for new methods of baking to improve the quality of commercially baked bread while at the same time enhancing the attractiveness of its appearance.

The present invention is characterized by a simple but novel step in the baking of bread which has been found to contribute markedly to the production of a good loaf of bread while effecting radical improvement in both the interior texture of the loaf and in the appearance and edibility of the surface or crust, a loaf of bread baked by the present invention having in fact a distinctive texture and crust, the texture being both finer and more uniform throughout and the crust having a unique golden and attractive rather mottled color, the loaf being thus pleasing to the sight, palatable, and easy of digestion and assimilation, as well as nutritious.

It is well-known that during the conventional step of baking which is known as "proofing," the dough, after having been divided and coming from the molder or other preparatory apparatus, is placed in a pan and left to "proof" in a mildly warm temperature, during which time the dough rises somewhat under the fermenting action of the dough ingredients. This conventional proofing of the dough starts the aeration of the dough, which is further completed in the later step of baking, with the concurrent formation of carbonic acid gas and air cells in the dough which gives it desirable lightness and springiness. If the dough is under-proofed, the gluten is frequently not stretched enough so as to permit the formation of this cellular texture and the resulting loaf will be somewhat soggy and heavy. If, on the other hand, the dough is excessively proofed, the gluten will frequently be stretched too much through over-expansion and will not be strong enough to retain its springiness during the further expansion of the carbonic acid gas and air in the dough during baking and thus the loaf may lose its desirable cellular texture.

During such proofing (of an apportioned amount of dough in each pan for an individual loaf of bread) to a desirable extent or what is commonly known as a somewhat "short" proof (since there is usually a greater danger of the bread being unfavorably affected by over-proofing than by under-proofing) there is a tendency for the carbonic acid gas and air produced by the dough fermentation to be occluded or dissolved in the moisture of the dough, a certain recognized moisture content thereof being of course necessary and desirable. This moisture in the dough, while it is standing during proofing tends to gravitate to that portion of the dough which is nearest the bottom of the pan.

I have found that if the dough so formed and proofed be turned upside down after proofing and the bread baked in this reversed position from that which it occupied during proofing, the more or less wet portion of the dough formed along the bottom of the pan will now be uppermost during baking, and this wetter portion of the dough thus will receive the benefit of the higher temperature to which the uppermost part of the dough is subjected to during baking by reason of the heat radiated from the walls of the oven. Consequently air and carbonic acid gas previously dissolved or otherwise occluded in this portion of the dough will be desirably vaporized and separated from the moisture and permitted to perform their desired function of aerating the loaf and contributing to its desirable characteristics already referred to. Thus the texture of the loaf will be finer and more uniform while at the same time the usual carmelization of the sugar in the crust, and particularly the upper crust (which sugar is likely to be associated in larger quantity with the moisture in the dough) will be enhanced, thus giving the crust the desirable characteristics previously referred to for the latter. At the same time excessive formation of dextrines on the upper crust of the loaf, which frequently give the crust an undesirable glaze, will be minimized.

I will now describe illustrative means for practicing my improved method, it being understood that it is sufficient for present purposes to describe only that which is new in the present invention and by which the latter is characterized, and for such purposes reference may be had to the accompanying drawings, forming a part of the present specification, and in which—

Figure 1 is a perspective view showing a pan-like frame, or bottom-less and top-less bread pan, which may be used for the practice of the present invention;

Figure 2 is a plan view of a plate employable with the invention, the plate being shown broken away to save space in the drawing;

Figure 3 shows a side elevational view of the pan of Figure 1, into which a quantity of dough apportioned for a loaf of bread has been placed for proofing and associated with the plate upon which the dough and frame rest during proofing, the broken lines in this figure indicating another similar plate, which may be subsequently employed;

Figure 4 is a view similar to Figure 3 but showing the frame and dough of Figure 2 now turned upside down and resting upon a second plate, which is shown in broken lines in Figure 2, the plate shown in full lines in Figure 2 being removed; and Figure 5 is a view showing the adaptation of the process to a battery of frames or pans secured together, as is conventionally well-known, for convenience in handling.

Referring in detail to the illustrations of the drawings and in accordance with the present invention, the pan-like frame 10 may be of metal construction and may be specially constituted for the purpose, as here shown, or might be formed by cutting out the bottom of a conventional baking pan. In either case, it will thus have only the laterally facing walls 11, 12, 13 and 14 and without any top or bottom.

The plate 15 may also be of metal, of sufficient area to wholly underlie the frame 10 and to extend slightly beyond it for convenience in handling, as shown in Figure 3. The plate need be only thick enough to give it the desired rigidity so that the plate and frame with the dough therein as next described, may be handled as a unit. The plate may if desired have lugs 16 at each end by which it may be picked up conveniently, the lugs 16 being adjacent the margin of the plate whereby the frame 10 may be located on the plate 15 therebetween.

When now the frame 10 is superimposed on the plate 15, as shown in Figure 3, the apportioned amount of dough for an individual loaf of bread is then placed in the frame, which, in cooperation with the plate 15, functions somewhat as a pan. Thereupon the dough is left to proof, as already referred to, and will, after proofing, occupy a position somewhat as shown at 17 of Figure 3, the proofing being stopped short of the point where the dough would rise above the upper edge of the frame 10.

Next, another plate 18, identical with the plate 15 and having if desired lugs 19 for handling, is placed over the frame 10 with the proofed dough 17 therein. In this case, the lugs 19 would be faced downwardly, whereupon the whole, including the plate 15, the frame 10 with the proofed dough 17 therein, and the plate 18, is turned upside down, with now the plate 18 on the bottom as indicated in Figure 4, the plate 15 being thereupon removed. The dough being still flowable, will sink along the walls of the frame to fill out, somewhat squarely, the lower part of the frame.

Finally, the plate 18 with the frame 10 carried thereon and containing the proofed dough 17, is placed in the oven and baked in the usual way whereby the dough 17 will rise further during baking and will become the baked loaf 20, during which the carbonic acid gas and air which was formerly occluded or dissolved in the excess moisture in the dough at the bottom of the pan but which is now on top, will be vaporized and expanded by the enhanced radiated heat which the upper part of the load receives during baking and will contribute to the improved results already referred to. After the completion of the baking step, the loaf 20 may be removed from the frame 10 and put through the usual bread wrapping machine or handled in any other conventional way as may be desired. It has been found that bread so baked is markedly superior to bread baked in the customary way without being turned upside down after proofing.

Figure 5 shows a battery of four such frames 10 connected together as by metal straps 21 as is customary in commercial bakery practice, and in this case the plate 22 may be provided, similar to the plates 15 and 18, and having lugs 23 thereon for handling, but of a larger size than for the single individual frame.

It will be understood that the invention is not intended to be limited to all or the exact sequence of steps hereinbefore described for purposes of illustration, and also that other physical expedients than those here particularly described might be employed without departing from the invention.

It will be further understood that the method here described might be employed equally well in the baking of other forms of bakery products, such as rolls or the like.

The invention having been described, what is here claimed is:

That improvement in the art of baking bread which is characterized by the steps of, selecting a predetermined quantity of dough requiring proofing for an individual loaf, placing said dough on a first support, allowing said dough to proof while uncovered and unconfined at its top but while confined at its sides and ends, placing a second support over the dough after proofing, turning the first support and dough upside down onto the second support to bring the moisture heavy bottom portion of the dough to the top, removing the said first support, and baking the dough with its moisture heavy portion uppermost and while still confined at its sides and ends.

RALPH LE ROY NAFZIGER.

REFERENCES CITED

The following references are of record in the file of this patent:

UNITED STATES PATENTS

| Number | Name | Date |
|---|---|---|
| 216,300 | Adam | June 10, 1879 |
| 616,871 | Allen | Jan. 3, 1899 |
| 763,653 | Bailey | June 28, 1904 |
| 1,214,302 | Hamilton | Jan. 30, 1917 |
| 1,535,827 | Greenwald | Apr. 28, 1925 |
| 2,061,149 | Garrett | Nov. 17, 1936 |
| 2,071,635 | Korda | Feb. 23, 1937 |
| 2,071,845 | Kowalski | Feb. 23, 1937 |

FOREIGN PATENTS

| Number | Country | Date |
|---|---|---|
| 64,390 | Germany | Sept. 15, 1892 |